United States Patent [19]

Ito et al.

[11] 4,208,114
[45] Jun. 17, 1980

[54] PHOTOGRAPHIC CAMERA

[75] Inventors: Fumio Ito; Mutsunobu Yazaki, both of Yokohama, Japan

[73] Assignee: Canon Kabushiki Kaisha, Tokyo, Japan

[21] Appl. No.: 919,769

[22] Filed: Jun. 28, 1978

Related U.S. Application Data

[62] Division of Ser. No. 812,846, Jul. 5, 1977, Pat. No. 4,122,472.

[30] Foreign Application Priority Data

Jul. 7, 1976 [JP] Japan .................................. 51-80539
Apr. 28, 1977 [JP] Japan .................................. 52-49126

[51] Int. Cl.² ....................... G03B 17/04; G03B 17/52
[52] U.S. Cl. ......................................... 354/86; 354/187
[58] Field of Search .................... 354/84, 85, 86, 187, 354/192, 219

[56] References Cited

U.S. PATENT DOCUMENTS 3,643,565 2/1972 Bellows .................................. 354/84
3,906,521 9/1975 Weda .............................. 354/187 X Primary Examiner—Michael L. Gellner
Attorney, Agent, or Firm—Toren, McGeady and Stanger

[57] ABSTRACT

An instant picture camera which uses a cassette housing photosensitive sheet material, has a storage area for storing developer agent and forms a visible image after the developing process by the agent in the storage area after exposure is disclosed. The camera includes a rear housing having a cassette housing chamber into which the cassette is loaded. A front housing has a device which can selectively expose the photosensitive material in the rear housing and is also included. A mechanism for advancing photosensitive material forms part of the camera which advances the material after exposure. An upper cover of the camera opens and closes an opening of the cassette housing chamber. The cover includes an opening which permits the discharging of the photosensitive sheet material being processed and advanced by the advancing mechanism to the outside. A folding device for bringing the rear housing and front housing either close to each other or far apart from each other is included in the camera arrangement. A bellows shields light in a space formed between the rear housing and front housing which is operable in association with the folding device. An opening and closing cover for covering the surface of the front housing operates in conjunction with the previous upper cover and folding device.

2 Claims, 14 Drawing Figures

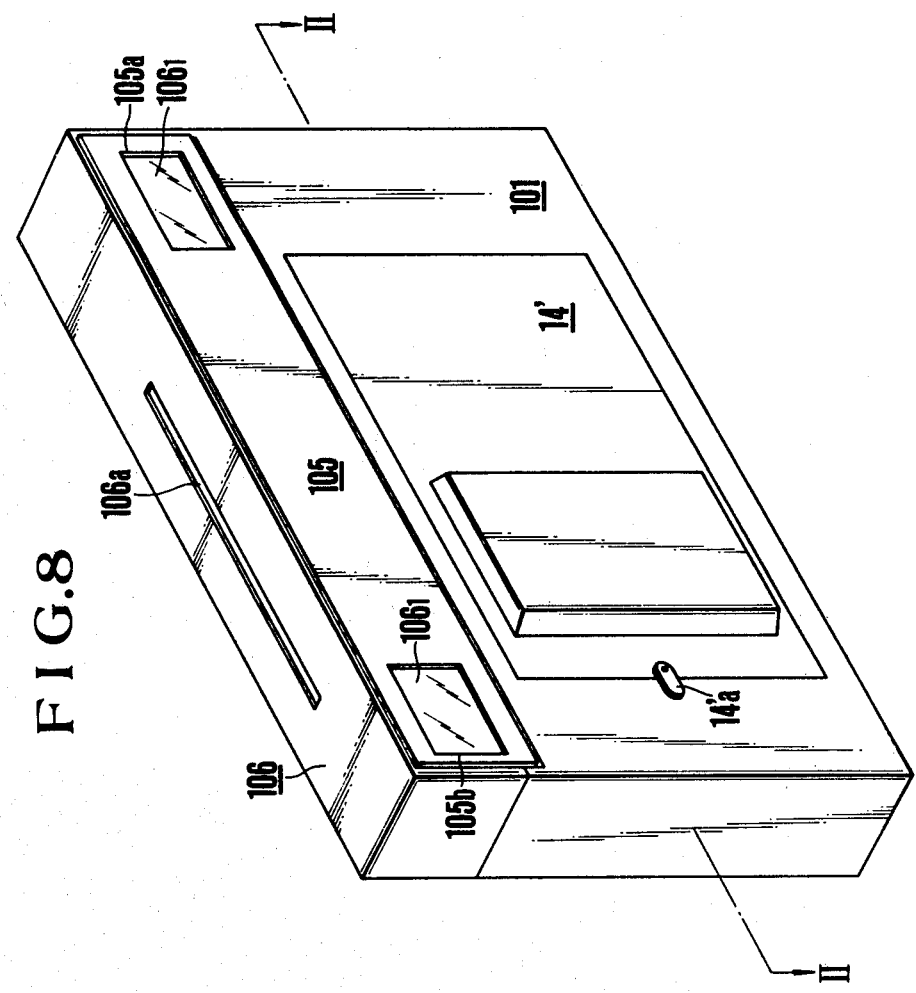

FIG.13
FIG.14
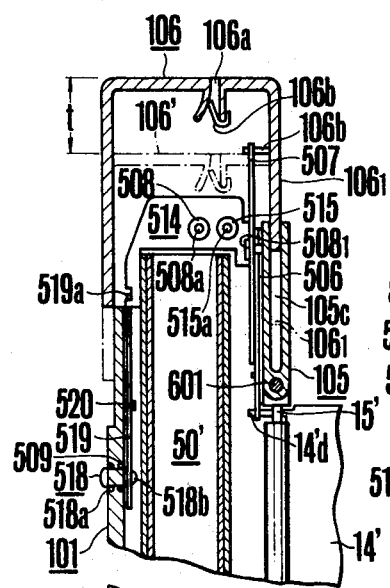
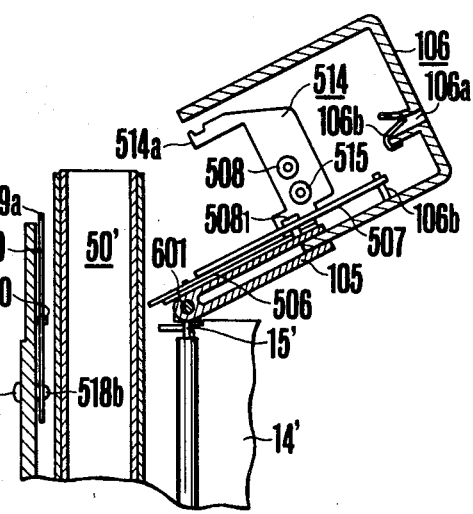
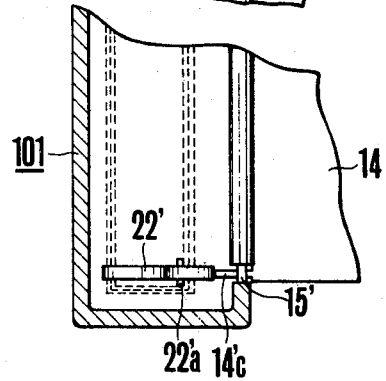

PHOTOGRAPHIC CAMERA

This is a division of application Ser. No. 812,846, filed July 5, 1977, now U.S. Pat. No. 4,122,472.

BACKGROUND OF THE INVENTION

1. Field of the Invention

The present invention relates to a photographic camera.

2. Description of the Prior Art

A camera which can have its shape changed depending on a time of use and a time when not in not in use, for example a camera, in which a front housing containing a photographic optical system, an exposure device, etc. and a rear housing containing photosensitive material for exposure and a finder optical system are coupled together by a foldable coupling device such as a bellows, etc., and the coupling device is extended to bring the distance between the front housing and the rear housing to such a length as suitable for photographing, and wherein the coupling device is collapsed when photographing is not performed so as to have the front housing and the rear housing located very close to each other in order to make a camera compact for carrying, has been proposed heretofore in many ways.

A camera of this type, for example, uses a photosensitive sheet material of self-developing type, a so-called "instant picture camera". The photosensitive sheet material of a self-developing type can be found for example in the specification of U.S. Pat. No. 3,682,076. Such photosensitive sheet material of self-developing type disclosed in this U.S. Pat. No. 3,682,076 has a bag storing self-developer process liquid within the material, and the bag storing the developer liquid is broken when said material is carried outside of the camera through a pair of pressure contacting rollers provided at a photosensitive material carry-out device within the camera after exposure. Developer process liquid flowing out of the bag is spread over a photosensitive surface of the photosensitive sheet material, thus conducting self-developing process. The photosensitive sheet material is housed in a film cassette with a plural number of sheets being analyzed. The camera is loaded when a cassette with a photosensitive sheet material is placed into the rear housing. This photosensitive sheet material of self-developing process type does not employ a method for making only a negative image on the photosensitive material and making a position image on another photographic paper enlarging the negative image like a photosensitive material used in an ordinary camera. Instead a positive image is formed in its actual size on an exposure surface being exposed without being enlarged and it is so viewed and appreciated. Thus if a size of a photosensitive surface is too small it is rather difficult to appreciate. Therefore, the size of photosensitive sheet material of self-developing process type is much larger than that of a roll film of 35-mm size. Thus the shape of an instant picture camera is much larger than that of an ordinary camera using a roll film of 35-mm size, resulting in poor portability.

Because of this reason, and in order to improve portability even to a limited extent especially in an instant picture camera, a front housing containing a photographic optical system, an exposure device, etc. and a rear housing containing a photographic sheet material, a finder optical system, etc. are coupled by a foldable coupling device such as a bellows, etc., and said coupling device is extended as photographing is done to bring the distance between the front housing and the rear housing to a length suitable for photographing, while the coupling device is collapsed when photographing is not done to have the front housing and the rear housing come very close to each other. This assures compactness when the camera is carried.

While photosensitive material is emitted from an exit of the camera to outside of the camera by pressure rollers provided at a photosensitive material emission device within the camera after exposure in this kind of instant picture camera, the distance between the pressure contacting rollers and the outlet for carrying out photosensitive material in this instant picture camera is sufficiently provided. The reason therefor is that a bag storing self-developer process liquid is provided within the photosensitive material and the bag containing developer process liquid is broken as it passes between a pair of pressure contacting rollers provided at the photosensitive material carry-out device within the camera after exposure. The developer liquid flowing out of the bag is spread by the pressure contacting rollers for conducting self-developing process. Further it takes some time until said developer liquid covers entire photosensitive surface. If external light hits the exposed photosensitive surface before the developer liquid covers the entire photosensitive surface, the finished picture is adverse affected. Therefore, to prevent external light from hitting the photosensitive surface before the developer liquid covers the entire photosensitive surface, the distance between the pressure contacting rollers and the photosensitive material carryout outlet is sufficiently large so that enough time for the developer liquid to cover the entire photosensitive surface.

Also, in a camera having a finder window and a range finding window provided therein as in an instant picture camera and also in a single lens reflex camera especially, a finder window and a range finder window are provided at a front plane of a camera, and these windows are covered with glass plates. Difficulties sometimes occur in this kind of camera when the glass planes are stained upon being touched by a stained hand when the camera is carried without being placed in a camera case or when the glass plates are damaged as the camera is hit by some object.

SUMMARY OF THE INVENTION

A first object of the present invention is to provide a photographic camera having a structure that can be made compact when carried compared to conventional ones.

A second object of the present invention is to provide a photographic camera, which has a rear housing into which a film cassette containing a photosensitive material is loaded, a front housing having a device which can selectively expose the photosensitive material in the rear housing, and a bellows coupled between the rear housing and front housing in a freely extendable and shrinkable manner, having such structure that a position of said cassette can be selectively shifted to such a position as placing the exposure device within the front housing at a position suitable for exposure of the photosensitive material when the bellows is extended and to a position not hindering the front housing from being housed in the rear housing, thus reducing the thickness thereof at a time when it is carried.

A third object of the present invention is to provide a photographic camera, which has a rear housing into which a film cassette containing a photosensitive material is loaded, a front housing having a device which can selectively expose the photosensitive material in the rear housing, a bellows which coupled the rear housing and the front housing in a freely extendable and collapsible manner, and a front cover device which can control the extending and collapsing of said bellows and can cover the front housing when the bellows is collapsed and the front cover to control the extending and collapsing of the bellows is brought in close contact with the rear housing to dispose the front housing therebetween. The above-mentioned extending and collapsing functions are made to be associated with opening and closing actions of the front cover so that, when the front cover is closed, the dimension in the direction of thickness of a camera and in the direction of movement of the photosensitive sheet material can be made small, thus securing compact size.

A fourth object of the present invention is to provide a photographic camera adapted to use a sheet-like photosensitive material which forms a visible image after development, comprising a front housing for exposing the sheet-like material, a rear housing having a holding device for housing and holding the sheet-like photosensitive material, a shifting device for shifting the holding device to form a space to house the front housing herein, a feeding device for advancing the sheet-like photosensitive material in the holding device while it is exposed and feeding thus exposed photosensitive material while it is treated with the developer, a take-out opening for taking the photosensitive material thus being fed by the feeding device out of the camera, and a shortening device which shortens a distance maintained between the feeding device and the take-out opening when such distance is not necessary, a bellows connecting expansively and collapsibly between the front housing and the rear housing, and a front cover which controls the expansion and collapse of the bellows, wherein the operations of the shifting device and the shortening device are associated with the opening and closing operations of the cover, so that the dimension in the direction of thickness of the camera and in the direction of movement of the photosensitive sheet material can be made small, thus securing a compact camera size.

A fifth object of the present invention is to provide a photographic camera of such a structure that a finder window and a range finder window can be protected when the camera is carried.

Other objects of the present invention can be made clear from the specification and the drawings to be explained below in detail.

BRIEF DESCRIPTION OF THE DRAWINGS

FIG. 1 and FIG. 2 are external oblique views to show a first example of a photographic camera according to the present invention, wherein FIG. 1 shows a state allowing the photographing while FIG. 2 shows a state desirable for carrying.

FIG. 5 and FIG. 6 show a second example in which a portion of the photographic camera according to the present invention shown in FIG. 1 to FIG. 4 is modified, wherein FIG. 5 is a cross-sectional view corresponding to FIG. 3 whereby an arrangement of a two-arm forked lever of FIG. 5 only is different from that of FIG. 3, while FIG. 6 is also a cross-sectional view corresponding to FIG. 4.

FIG. 7 and FIG. 8 are external oblique views to show a third example of a photographic camera according to the present invention, wherein FIG. 7 shows a state allowing a photographing, while FIG. 8 shows a state desirable for carrying.

FIG. 11 and FIG. 12 are plans to show a mechanism to move upper lid up and down in an association with the opening and closing action of a front cover of a photographic camera shown in FIG. 7 and FIG. 8, wherein FIG. 11 shows a state in which the upper lid is shifted upward allowing photographing; while FIG. 12 shows a state in which the upper lid is shifted downward and photographing becomes impossible.

FIG. 13 and FIG. 14 are cross-sectional views taken along the III—III line of a photographic camera shown in FIG. 7, wherein FIG. 13 shows a state where the upper lid is closed while FIG. 14 shows a state where the upper lid is opened.

DESCRIPTIONS OF THE PREFERRED EMBODIMENTS

Figure 1:
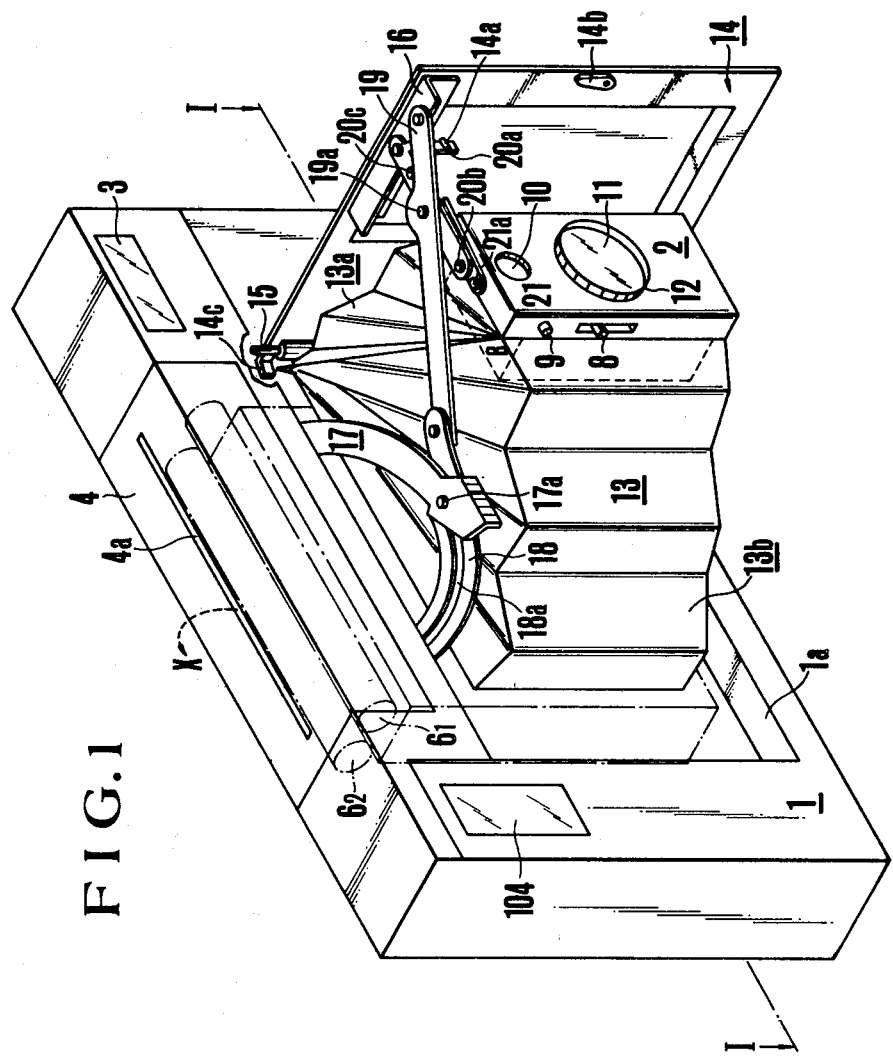

Now some examples of a photographic cameras according to the present invention will be explained in detail using a photographic camera of self-developing process type.

FIG. 1 to FIG. 4 show a structure of a first example of a photographic camera according to the present invention.

In FIGS. 1 to 4, what is shown as 1 is a rear housing, and 2 is a front housing, while 13 is a tubular shape bellows which is extendable and shrinkable and can place the rear housing and the front housing in a closely contacting state to each other and in a state being separated from each other, wherein said bellows 13 has its one end attached to the rear housing 1 and the other end thereof attached to the front housing 2 in order to attain a light tight camera. And the bellows 13 is largely divided into a segment shown by a symbol 13a and a segment shown by a symbol 13b, and is so made than when said bellows 13 is folded down, first the segment shown by the symbol 13b is rotated to clockwise direction around the point shown as the symbol A as a fulcrum thus said segment 13b is folded down, then the segment shown by the symbol 13a is rotated to counter-clockwise direction around the point shown by the symbol B as a fulcrum thus the segment 13a is folded down. Also when the bellows 13 is extended each segment is shifted in an order reverse to the one shown above.

What is shown as 11 is a photographic lens optical system provided at the front housing 2, and what is shown as 12 is a rotation ring to adjust focus by operating a focus adjustment mechanism provided at the front housing 2. What is shown as 8 is a charging member for an exposure adjusting device (not shown in the drawing) provided within the front housing 2, and what is shown as 9 is a trigger button to release the power charged by the charging member 8 and to initiate the exposure adjusting device. What is shown as 14 is a front cover to selectively cover an opening of a recess 1a formed at a front plane of the rear housing 1, and the front cover 14 is axially supported at an axle 15 fixed at the rear housing in a rotatable manner. What is shown as 16 is a bracket fixedly provided at an inner plane of the front cover 14, and what are shown as 17 to 21 are members forming a link mechanism which permits the bellows 13 to conduct extending and collapsing action in association with opening and closing of the front cover 14. With respect to the members constituting the link mechanism, what is shown as 17 is a lever having its one end axially supported at an inner wall of the rear housing 1 in a rotatable manner, and the level 17 is rotatingly biased to a counterclockwise direction by a spring. What is shown as 18 is a lever having its one end axially supported at an inner wall of the opening part 1a of the rear housing 1 in a rotatable manner, and a long groove 18a to which a pin 17a of the lever 17 is slidably engaged is provided at a part of the lever 18. What is shown as 19 is a lever having its one end axially supported at the bracket 16 in a rotatable manner, and having the other end thereof axially supported at the end part of the lever 18. The lever 19 is so associated with the lever 17 and the lever 18 so that the lever 18 may be rotatingly shifted in a counterclockwise direction and the lever 17 in a clockwise direction, respectively as the front cover 4 is closed. What is shown as 20 is a lever having its one end axially supported at the bracket 16 in a rotatable manner. A long hole 20c with which a pin 19a on the lever 19 is slidably engaged, and a bent part 20a, which is contacted with a pin 14a protruding from the inner wall plane of the front cover 14, are provided at a part of the lever 20. The bent part 20a is to prevent the lever 20 from rotating to a counterclockwise direction together with the pin 14a. What is shown as 21 is a positioning lever having its one end fixed on the front housing 2 through a pin 21a, and a pin 20a provided at the other end of the lever 20 is engaged with the positioning lever 21 in a rotatable manner. The levers 20 and 21 maintain the front housing 2 parallel with the rear housing 1 when the above-mentioned cover 14 is opened. What is shown as 14a is an opening and closing knob of the front cover 14, while 14b is an opening and closing claw operated by the opening and closing knob 14a. What is shown as 3 is a window of a finder provided at the rear housing 1, and what is shown as 104 is an electronic flash device built in the rear housing 1. What is shown as 5 is a cassette retaining member provided in the rear housing 1 for retaining a film cassette 50 loaded in the housing. What is shown as 4 is an upper lid to load and unload a film cassette 50 into or from the rear housing 1, and an opening 4a is provided on the upper lid 4 to allow the exposed photosensitive sheet material within the film cassette 50 to be passed outside of the rear housing 1. What are shown as $6_1$, $6_2$ are film feeding rollers axially supported at the upper lid 4 respectively in a rotatable manner. The rollers $6_1$, $6_2$ are rotated by a driving device which is not shown in the drawing but is provided within the rear housing 1, as the exposure of the photosensitive sheet material is completed.

Figure 3:
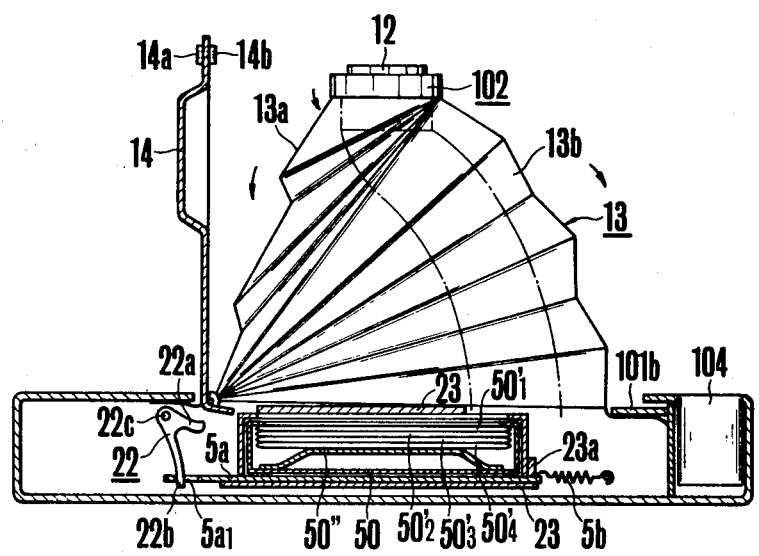
FIG. 3 is a cross-sectional view taken along I—I line of FIG. 1.
Figure 4:
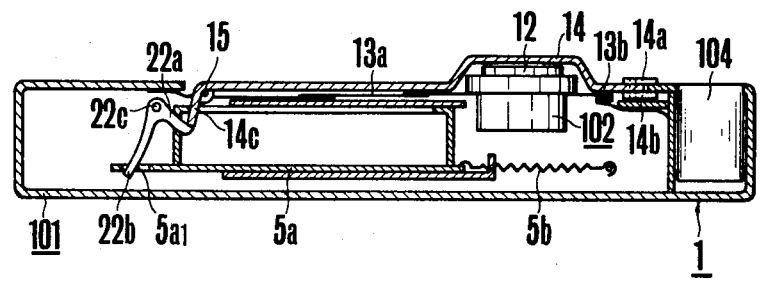
FIG. 4 is a cross-sectional view taken along II—II line of FIG. 2.

Also, as a film cassette 50, for example, one such as known in the specification of U.S. Pat. No. 3,682,076 is used. That is, a plurality of photosensitive sheet materials $50_1$, $50_2$, $50_3$, $50_4$, of self-developing process type are laid up within a film cassette 50 and the photosensitive sheet materials $50_1$, $50_2$, $50_3$, $50_4$ are biased in the direction of the front housing 2 by a sheet spring 50" fixed at a bottom of the cassette 50, and the photosensitive sheet materials $50_1$, $50_2$, $50_3$, $50_4$ have bags storing self-developer liquid in each one thereof. After exposure, when the sheet material are sent out to between the rollers $6_1$, $6_2$ by a photosensitive sheet material carry out device (not shown in the drawing) provided within the rear housing 1 and further are advanced in the direction of the photosensitive material carry-out outlet 4a by the rollers $6_1$, $6_2$, bags storing developer liquid are broken by the pressure supplied by said rollers $6_1$, $6_2$. The self-developing process is performed by the developer liquid flowing out of the bags. The other end of the front cover 14 has a bent part 14c being bent within the rear housing 1 as shown in FIG. 3, FIG. 4. What is shown as 23 is a restraining and guiding member fixedly provided within the rear housing 1. The member 23 is to have a film cassette housing chamber forming member 5 housing the film cassette 50 allowed to escape from an exposure position when the camera is folded down and to provide a space to house the front housing 2 within the rear housing 1 by guiding the forming member 5 and by placing the member 5 at a prescribed position again as the camera is extended. A plane of the film cassette housing chamber forming member 5 facing the restraining and guiding member 23 has a flange part 5a protruding out of other planes formed thereon. The film cassette housing chamber forming member 5 is biased by a spring 5b so that a part of said flange part 5a comes in contact with the position determining bent part 23a of the restraining and guiding member 23. Also, a hole $5a_1$ is formed at a part of the flange part 5a of the film cassette housing chamber forming member 5. What is shown as 22 is a two-arm fork lever fixed at an axle 22c being axially supported at the rear housing 1 in a rotatable manner, and one end 22b of the two-arm lever 22 is engaged with the hole $5a_1$ of the film cassette housing chamber forming member 5. The other end 22a thereof is placed at at a position which will be pressed by the bent part 14c of the front cover 14 as the front cover 14 is closed, and the two arm lever 22 is rotated to clockwise direction as the front cover 14 is closed, thereby shifting the film cassette housing chamber forming member 5 toward the two-arm lever 22 while resisting the biasing power of the spring 5b to form a space to house the front housing 2 within the rear housing 1.

The operation of a camera having the above-mentioned arrangement will be explained below.

Figure 2:
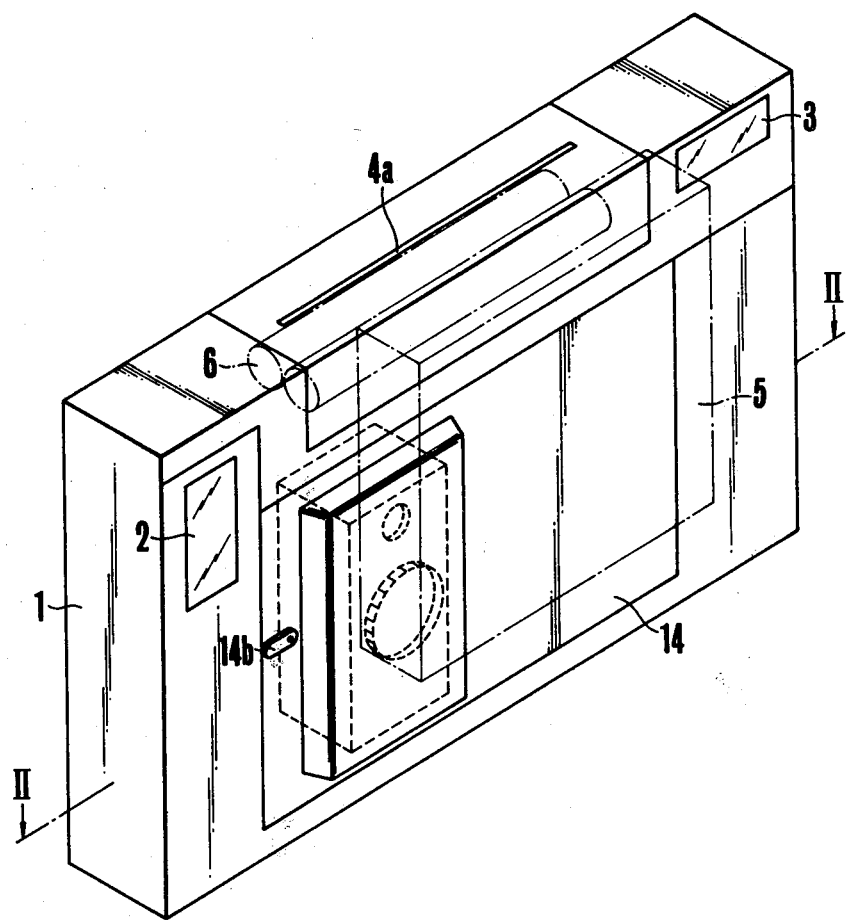

In FIG. 1 and FIG. 3, a camera is extended and is placed in a usable state. When the front cover 14 is rotated in a clockwise direction from the state for folding down the camera for convenience of carrying, the part 13a of the bellows 13 is folded down toward the boarder line 13c between the part 13a and the part 13b by the linked function of the lever 20 and the positioning lever 21. The front housing 2 faces in a direction toward to the front cover 14. As the front cover 14 is rotated in a clockwise direction, the lever 19 rotates the lever 18 in a counterclockwise direction. In this manner the lever 17 is rotated in a clockwise direction which resists the biasing power of spring. Thus the part 13b of the bellows is folded down toward the rear housing 1 side. As the front cover 14 is rotated, the two-arm lever 22 is rotated in a clockwise direction by the bent part 14c of the front cover 14, thereby shifting the film cassette housing chamber forming member 5 toward the two arm lever 22. Then a photographing main part 102 is housed in a space within the rear housing 1 formed by the shifting of the film cassette housing chamber forming member 5. After the front cover 14 closes the opening part 1a of the rear housing 1, the opening and closing locking member 14a is rotated so as to have the locking claw 14b engaged with a part of the rear housing 1 for effecting closed locking. Therefore, the thickness of a camera main body can be held down to a length in a direction of the axis of either the rear housing 1 or the front housing 2, whichever is greater and, thus, a camera can be made to have a very small thickness. Such a condition is shown in FIG. 2 and FIG. 4.

Next, to bring the camera from a condition of being folded down to an extended state allowing for photographing, the opening and closing locking member 14a is rotated and the locking claw 14b is disengaged from a part of the rear housing 1. Then the lever 17 tends to rotate in a counterclockwise direction by the action of the spring which is biasing the lever 17. Therefore the lever 18 rotates to clockwise direction and thereby the lever 19 releases the front cover 14. The bellows 13 will have its part 13b extended first; then the part 13a, contrary to the order as it is folded down; and lastly it is placed in the state shown in FIG. 1 and FIG. 3. Also, in association with the releasing action of the front cover 14, the two-arms lever 22 which has been rotatingly biased in a counterclockwise direction through the film cassette housing chamber forming member 5 by the spring 5b will be rotated as the bent part 14c of the front cover 14 is separated from said two arms lever 22. Then the lever 22 comes in contact with the bent part 23a of the restraining and guiding member 23 and is rotated until it is placed at a prescribed exposure position.

Figure 5:
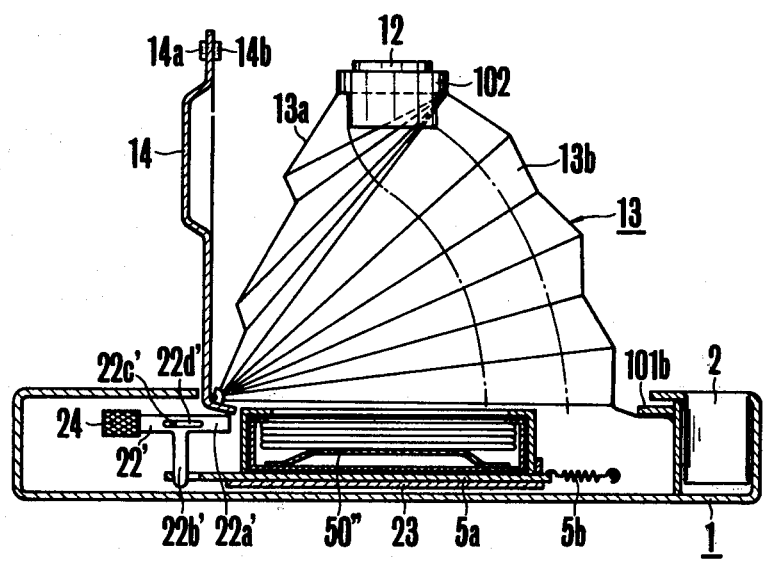
Figure 6:
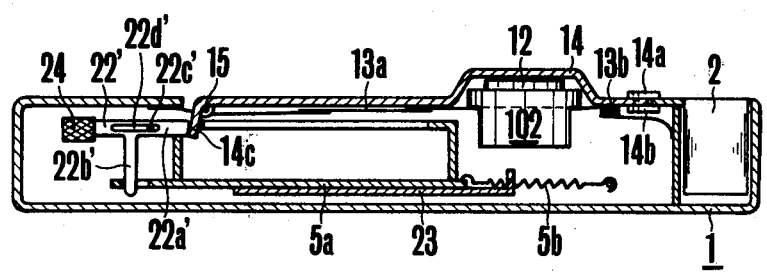

FIG. 5 and FIG. 6 show the second example in which a camera shown from FIG. 1 to FIG. 4 is partially modified, wherein the film cassette housing chamber forming member 5 is shifted by manually operating a shifting control knob 24 provided at outside of the camera, while said member 5 is shifted in association with the opening and closing of the front cover 14 in the example shown in FIG. 1 to FIG. 4. In the drawings the members having the same numbers as those shown from FIG. 1 to FIG. 4 are the same members having same function. The two-arms lever 22' shown in FIG. 5, FIG. 6 has a long hole 22d' formed therein and a pin 22c' fixed at the film housing main body 101 is engaged with said hole 22d', so that the lever 22' can be slided to a direction of the long hole 22d' being guided by said pin 22c'. One end 22b' of the two arms lever 22' is engaged with the hole 5a₁ of the film cassette housing chamber forming member 5, while the other end 22a' thereof is extended almost in parallel with the restraining and guiding member 23.

In the state of FIG. 5, the shifting control knob 24 is shifted to the right side and the film cassette housing chamber forming member 5 is placed at a prescribed exposure position. Even if the front cover 14 is to be closed in this state, the lower part of the bent part 14c of the front cover 14 collides with one end 22a' of the two-arms lever 22', thus the front cover 14 cannot be closed. When the front cover 14 is closed, the shifting control knob 24 is slided in the left direction in the drawing and the film cassette housing chamber forming member 5 is shifted in a left direction to form a space to house the front housing 2. At the same time, the end 22a' of the two arms lever 22' is placed in a state wherein it is separated from the lower part of the bent part 14c of the front cover 14, thus the front cover 14 can be smoothly closed.

Also, the front housing 2 of a camera according to the present invention is inserted into and removed from the rear housing 1 moving along the two dots chain line shown in FIG. 5.

As has been explained above, like the first example shown in FIG. 1 to FIG. 4 and the second example shown in FIG. 5, FIG. 6, in a foldable camera, as the camera is folded down, a film cassette holding member which holds a film cassette at an exposure position within a rear housing is moved from the exposure position with a film cassette being held thereby and the front housing is placed in a space made as the film cassette holding member is moved. Therefore it has the effect that a camera in a folded state can be made to have a very compact size.

Figure 7:
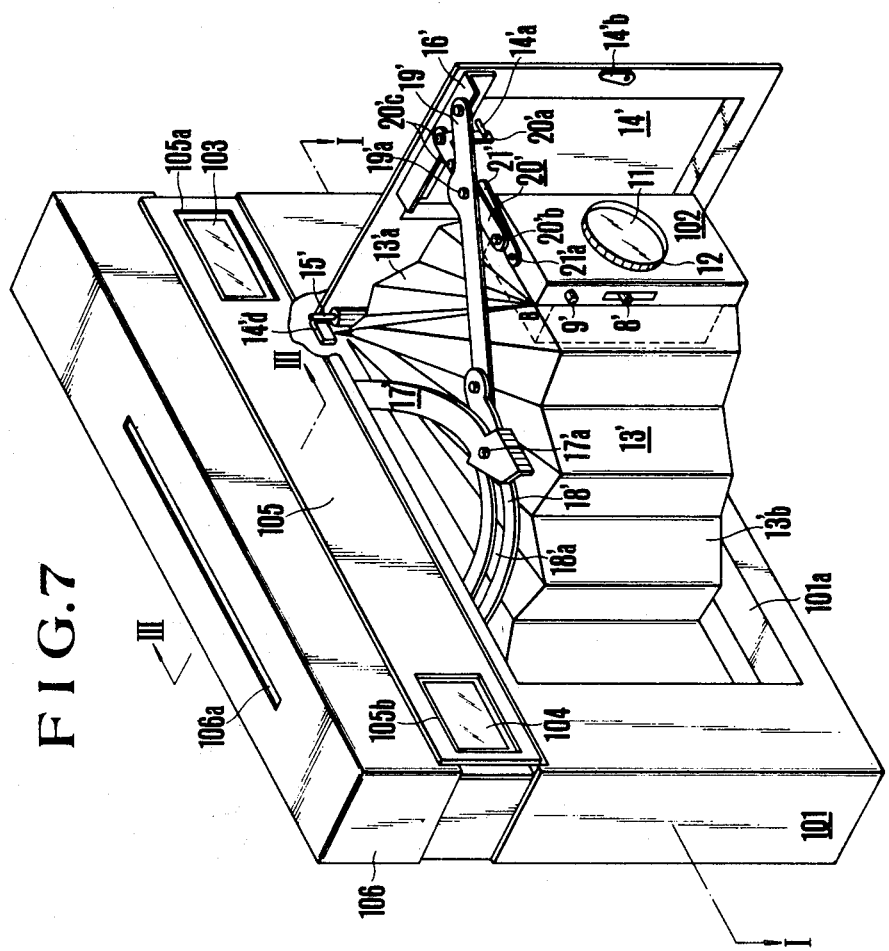
Figure 11:
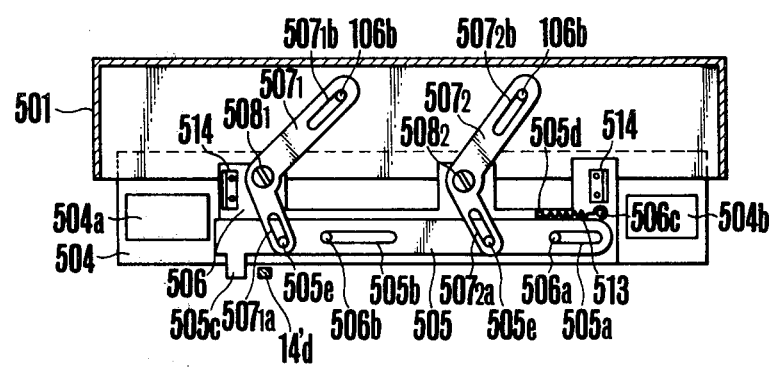
Figure 12:
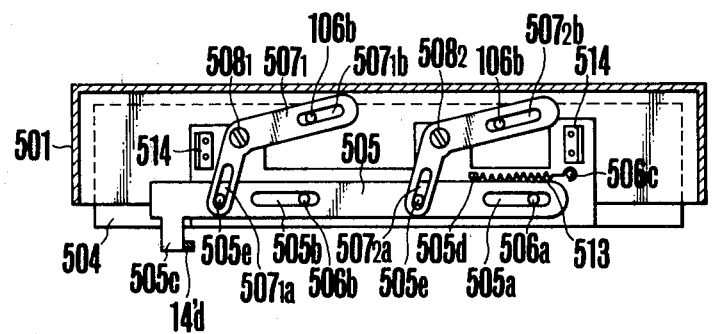

FIG. 7 to FIG. 14 show the third example of a photographic camera according to the present invention. In FIG. 7 to FIG. 14, what is shown as 101 is a rear housing, 102 is a front housing, 13' is a tubular bellows coupling the rear housing 101 and the front housing 102 in such manner as placing them in a closely contacting state to each other or in a separated state from each other. The bellows has its one end attached to the rear housing 101 and has the other end thereof attached to the front housing 102, respectively, with light shielding effect, thus ensuring the light shielding between said two housings. The bellows 13' is divided largely into a segment shown as 13'a and the segment shown as 13'b, and when said bellows is folded down, first the segment shown as 13'b is rotated in a clockwise direction around the point shown as A in the drawing as a fulcrum and is folded down, then the segment shown as 13'a is rotated in a counterclockwise direction around the point shown as B in the drawing as a fulcrum, thus said segment 13'a is folded down. Also, as the bellows 13' is extended, each segment is moved in an order contrary to said order. What is shown as 11' is a photographic lens optical system provided at the front housing 102, and what is shown as 12' is a rotation ring to adjust focus for operating a focus adjusting mechanism provided at the front housing 102. What is shown as 8' is a charging member of an exposure adjusting device (not shown in the drawing) provided within the front housing 102, and what is shown as 9' is a trigger button to release the power charged by said charging member 8' and to initiate said exposure adjusting device. What is shown as 14' is a front cover to selectively cover an opening of an recess 101a formed at a front plane of the rear housing 101. The front cover 14 is axially supported at an axle 15' fixed at the rear housing 101 in a rotatable manner. What is shown as 16' is a bracket fixedly provided at an inner plane of the front cover 14', and 17' to 21' are members to constitute a linking mechanism to have the bellows 13' conduct the extending and collapsing actions. Of the members constituting a linking mechanism, 17' is a lever having its one end axially supported at an inner wall of the rear housing 101 in a rotatable manner and the lever 17' is rotatingly biased in a counterclockwise direction by a spring not shown in the drawing. What is shown as 18' is a lever similarly having its one end axially supported at an inner wall of the opening 101a of the rear housing 101 in a rotatable manner, and a long groove 18'a engaged with a pin 17'a of the lever 17' in a slidable manner is provided at a part of the lever 18'. What is shown as 19' is a lever having its one end axially supported on the bracket 16' in a rotatable manner, and having the other end thereof axially supported at an end of the lever 18' in a rotatable manner. The lever 19' is associated with the lever 17' and the lever 18' in such manner that the lever 18' can be rotatingly shifted in a counterclockwise direction and the lever 17' in a clockwise direction respectively. What is shown as 20' is a lever having its one end axially supported at the bracket 16' in a rotatable manner, and a long hole 20'c to which a pin 19'a on the lever 19' is engaged in a slidable manner and a bent part 20'a contacting with a pin 14'a protruding out of the inner wall plane of the front cover 14' are provided at a part of said lever 20'. Bent part 20'a is to prevent the lever 20' from rotating in a clockwise direction together with the pin 14'a. What is shown as 21' is a positioning lever having its one end fixed at the front housing 102 through the pin 21'a, and a pin 20'b provided at the other end of the lever 20' is rotatably engaged with said positioning lever 21'. These levers 20' and 21' are to maintain the front housing 102 parallel with the rear housing 101. What is shown as 14'a is an opening and closing knob of the front cover 14' and 14'b is an opening and closing locking claw operated by the knob 14'a. What is shown as 105 is an upper lid supporting body axially supported by an axle 601 fixed at the rear housing 101 in a rotatable manner, and a cross-sectional shape of said upper lid supporting body 105 is formed in an almost U-shape as shown in FIG. 13 and FIG. 14. An opening 105a formed at the upper lid supporting body 105 is an opening for a finder provided within the rear housing 101, while what is shown as 105b is an opening for a stroboscope provided also in the rear housing 101. What is shown as 106 is an upper lid having a photosensitive sheet material carry out outlet 106a, and a front side plate 106$_1$ of said upper lid 106 is slidably retained within a U-shaped part 105c of the upper lid supporting body 105, wherein when the upper lid 106 is pressed down the front plate 106$_1$ is shifted to a position of 106', sliding within the U-shaped part 105c of the upper lid supporting body 105 for covering the openings, 105a, 105b as shown in FIG. 2. A device to support the pressing down and pressing up of the upper lid 106 with the upper lid supporting body 105 is shown in detail in FIG. 11 to FIG. 14. What is shown as 506 is a supporting plate fixed at the upper lid supporting body 105 with an attaching member 514. What is shown as 505 is a lateral movement plate having long holes 505a, 505b which are engaged to pins 506a, 506b planted on the supporting plate 506, and engaging parts 505c, 505d are formed thereon. What is shown as 513 is a spring having its one end engaged with the engaging part 505d of the lateral movement plate 505 and having the other end thereof engaged with a pin 506c planted on the supporting plate 506. Said spring 513 is always to bias the lateral movement plate 505 to right direction in FIG. 11, FIG. 12. What are shown as 507$_1$, 507$_2$ are L-shaped levers axially supported at the supporting plate 506 in a rotatable manner by pins 508$_1$, 508$_2$ fixed on the supporting plate 506, and long holes 507$_1$a, 507$_2$a and long holes 507$_1$b, 507$_2$b are provided at both end parts of said levers 507$_1$, 507$_2$, respectively, wherein a pin 505c planted on the lateral movement 505 is engaged with the long holes 507$_1$a, 507$_2$a. Also a pin 106b planted on the upper lid 106 is engaged with the long holes 507$_1$b, 507$_2$b. A checking piece 14'd is provided at said front cover 14', and the checking piece 14'd has its engagement with the engaging part 505c of the lateral movement plate 505 released when the front cover 14' is opened, but it engages with the engaging part 505c of the lateral movement plate 505 as the front cover 14' is closed, shifting the lateral movement plate 505 in the left direction in FIG. 11, FIG. 12 resisting the biasing power of a spring 513. When the lateral movement plate 505 is shifted, the shifting of said lateral movement plate 505 is received by the L-shaped levers 507$_1$, 507$_2$ through the pin 505e, and said L-shaped levers 507$_1$, 507$_2$ are rotated to counterclockwise direction around fulcrums, pins 508$_1$, 508$_2$. The upper lid 106 receives the rotation of the levers 507$_1$, 507$_2$ through the pin 106b and is shifted downward. That is, the state of FIG. 11 shows a state when the front cover 14' is opened, while the state of FIG. 12 shows a state when the front cover 14' is closed. What is shown as 514 is a roller supporting body fixed at the upper lid supporting body 105, and an engaging claw 514a is formed at a part of said roller supporting body 514 extended in a direction of back plane of the rear housing 101. What is shown as 518 is a locking release button, and an inner forward end part 518b of the locking release button is formed in a tapered shape. The locking lever 519 is so biased by a spring that the other end of the lever is always contacted with the forward end part 518b of the locking release button 518. Also, the locking release button 518 is so made that its forward end part 518b always escapes to the back plane side of the rear housing 101 by a compression spring 509. When the locking release button 518 is in a pulled in state by the biasing power of the compression spring 509, the locking lever 519 is shifted to a position at which it is engageable with the engaging claw 514a of the roller supporting body 514 as shown in FIG. 7, and presses the locking release button 518 from outside resisting the biasing power of the compression spring 509, and as the forward end part 518b is made to protrude, the locking lever 519 is rotated around a fulcrum, the pin 520 by the forward end part 518b of said locking release button 518. And as the locking lever 519 is rotated the engagement between the claw 519a of the lever 519 and the engaging claw 514a of the roller supporting body 514 is released.

When the front cover 14' is closed, since the upper lid 106 is pushed down to a position shown by on dot chain line in FIG. 13, even if the engagement between the claw 519a of the lever 519 and the engaging claw 514a of the roller supporting body 514 is released, it is impossible to rotate the upper lid supporting body 105 using the axle 601 as a fulcrum as shown in FIG. 14. However, when the front cover 14' is opened as shown in FIG. 13, FIG. 14, as the engagement between the claw 519a of the lever 519 and the engaging claw 514 of the roller supporting body 514 is released by the above mentioned operation of the locking release button 518, the upper lid supporting body 105 is rotated using the axle 601 as a fulcrum as shown in FIG. 14, opening the cassette housing chamber opening of the rear housing 101, thus loading and unloading of a cassette 50 can be made. What are shown as 515, 518 are rollers fixed at axles 518a, 518b, respectively, being axially supported on the roller supporting body 514 in a rotatable manner. A gear is fixed on the axle 515a, although not shown in the drawing, and the gear is selectively engaged with a driving gear (not shown in the drawing) of a photosensitive sheet material carry out driving device which is activated after an elapse of a prescribed period of time after the trigger button 9 is operated and the photosensitive sheet material 50$_1$ in the cassette 50 is exposed, and receives the driving power of the carry out driving device to have the axle 515a fixing the roller 515 rotated integrally with roller 515. What is shown as 106b is a light shielding material which is made of elastic material and covers the photosensitive sheet material carry out outlet 106a of the upper lid 106, and the light shielding material 106b is to prevent external light from entering into the rear housing 101 from the carry out outlet 106a. The distance between the position of the photosensitive sheet material carry out outlet 106a of the upper lid 106 and the rollers 508, 515 in a state allowing the photographing as shown by solid line in FIG. 7 is made sufficiently long so that the photosensitive sheet material will not come out from the photosensitive sheet material outlet 106a to outside of the rear housing 101 before the developer liquid in the photosensitive sheet material covers entire photosensitive surface after developing is started by the rollers 508, 515. But, when the front cover 14 is closed and the upper lid 106 is pressed down, the photosensitive sheet material carry out outlet 106a is shifted to the position 106a' shown by one dot chain line shown in FIG. 13 thus they become very close to each other. Therefore, when the camera is not in use, as the front cover 14' is closed to press down the upper lid 106, the height of the camera becomes smaller as much as the dimension t in FIG. 13, thus it can be made compact.

While the above explanations have been made with respect to an arrangement wherein the height of a camera can be reduced in association with the opening and closing of the front cover 14' when the camera is not in use, now explanations will be made on such set up that the thickness of a camera can be reduced in association with the opening and closing of the front cover 14' when the camera is not in use. Such a set up is shown in detail particularly in FIG. 9, FIG. 10. A checking piece 14'c of the front cover 14 is provided at a position corresponding to that where the checking piece 14'd is provided. What is shown as 23' is a restraining and guiding member fixed within the rear housing 101, and the member 23' is to guide the shifting of the cassette housing chamber forming member 5' to make a space to contain the front housing 102 in a recess 101a of the rear housing 101, having the housing chamber forming member 5' spaced from an exposure position when the front cover 14' is closed, and is to position the housing chamber forming member 5' at a prescribed exposure position when said front cover 14' is opened. Also, the plane of the cassette housing chamber forming member 5' facing to the restraining and guiding member 23' has a flange part 5'a protruding than other planes formed thereon, and the housing chamber forming member 5' is so biased to right direction in FIG. 9 by the spring 5'b that a part of said flange part 5'a comes in contact with the position determining bent part 23'a of the member 23. Also, a hole 5'a₁ is formed at a part of the flange part 5' of the film cassette housing space forming member 5'. What is shown as 22' is a two-arm lever fixed to an axle 22'c being axially supported at the rear housing 101 in a rotatable manner, and one end 22'b of the lever 22' is engaged with the hole 5'a₁ of the cassette housing chamber forming member 5', while the other end 22'a of the same comes to such position as being pressed by the bent part 14'c of the front cover 14' as the cover 14' is closed, wherein when the cover 14' is closed said two-arm lever 22' rotates to clockwise direction thereby shifting the cassette housing chamber forming member 5' toward the two-arm lever 22' resisting the biasing power of the spring 5'b for forming a space to place the front housing 102 within the rear housing 101. Also what is shown as 601 is a main capacitor for a stroboscope.

As the film cassette 50' loaded into the film cassette housing chamber forming member 5', such cassette as shown in the specification of U.S. Pat. No. 3,682,076 is used as an example, being similar to those shown in the above mentioned first and second examples is used. That is plural number of photosensitive sheet materials 50'₁, 50'₂, 50'₃, 50'₄ of self developing type are laid up in the film cassette 50', and the sheet materials 50'₁, 50'₂, 50'₃, 50'₄ are biased toward the front housing 102 by a sheet spring 50" fixed at the bottom of the cassette 50'. And each one of said sheet materials, 50'₁, 50'₂, 50'₃, 50'₄ has a bag storing self developer liquid within the materials, wherein the bag storing self developer liquid is broken by the pressure between the rollers 505, 518 when the sheet material is sent out to between the rollers 515, 518 by a photosensitive sheet material carry-out device provided within the rear housing 101 after exposure and is advanced to a direction of the photosensitive material carry-out outlet 106a by the rollers 515, 518, then self developing process is done by the developer liquid flowing out of said bag.

Now, explanations will be made describing the operation to shorten the thickness of a camera in association with the opening and closing of the front cover 14' as the camera is not in use.

Figure 9:
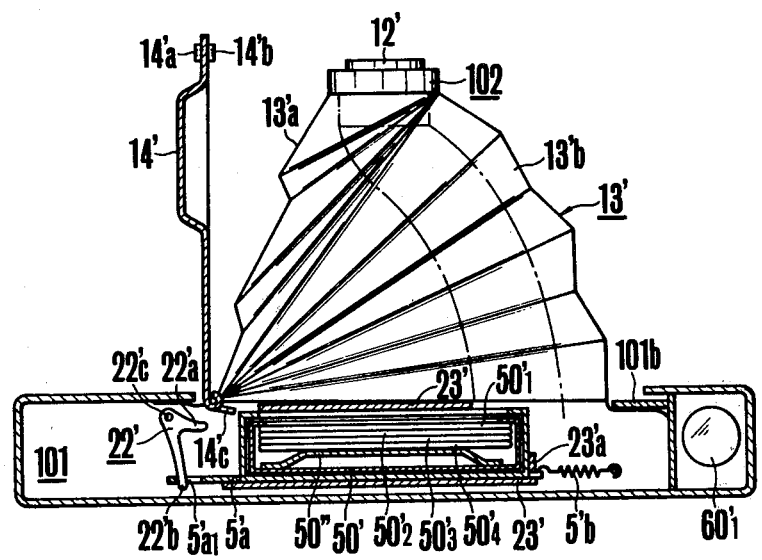
FIG. 9 is a cross-sectional view taken along I—I line of FIG. 7.
Figure 10:
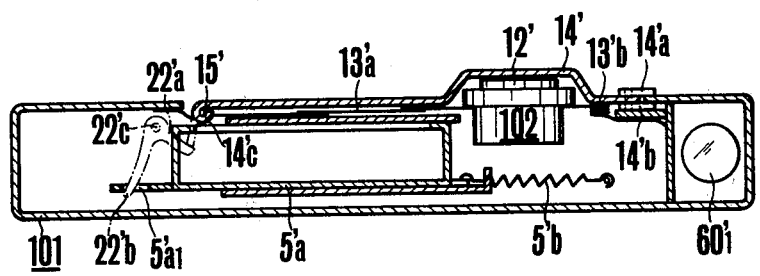
FIG. 10 is a cross-sectional view taken along II—II line of FIG. 8.

FIG. 9 shows a state wherein the front cover 14' is opened and photographing can be done. In this state, the checking piece 14'c of the front cover 14' is placed at a position wherein it is not engaged with the two-arm lever 22' and the cassette housing chamber forming member 5' is placed at an exposure position as shown in FIG. 9 by biasing power of the spring 5'b, wherein when the trigger button 9' is operated under the state and the shutter within the exposure adjusting device is activated the photosensitive sheet material 50', which is laid on the top of the plural number of such sheet material within the cassette 50' is in a state allowing exposure. When a use of the camera is finished and said cover 14' is closed the checking piece 14'c of said cover 14' rotatingly bias the two arm lever 22' to clockwise direction in association with the closing action of said cover 14'. When rotating power in a clockwise direction is given to said two arm lever 22', since said two-arms lever 22' and the cassette housing chamber forming member 5' are in an engaged relationship with each other, the forming member 5' is shifted in a lefthand direction in FIG. 9 together with the rotation of the two-arm lever 22' resisting the biasing power of the spring 5'b, and a space to place the front housing 102 therein is formed within the rear housing 101 as shown in FIG. 10, thus containing the front housing 102 within said space. As the front cover 14 is opened to use the camera, in a course contrary to the above, the checking piece 14'c of the front cover 14 is shifted in such direction as being separated from the two-arm lever 22' in association with the opening action of the front cover 14', therefore the two-arm lever 22' is rotated by receiving the biasing power of the spring 5'b through the cassette housing chamber forming member 5', thus the forming member 5' is placed at an exposure position again, assuming the state shown in FIG. 9. Therefore, by such set up the thickness of the camera when it is not in use can be reduced to about the thickness of the rear housing 101.

As has been explained above, in a camera according to the present invention shown in FIG. 7 to FIG. 14, the dimension in the height direction as well as the dimension in the thickness direction of the camera can be reduced in association with the opening and closing action of the front cover 14'. Therefore, it is quite advantageous in actual use so as to be convenient for carrying. At the same time, since the finder glass window, the stroboscope glass window, etc. are covered with the upper lid as the camera is carried, the finder glass window and the stroboscope glass window, etc. can be protected from dust, etc. at a time of carrying and storing. Further accidents where a foreign object hits the finder glass window and the stroboscope glass window by carelessness breaking the same when the camera is carried will be prevented.

What is claimed is:

1. An instant picture camera which uses a cassette housing photosensitive sheet material, which has a means storing developer agent and forms a visible image after the developing process by said agent in the storing means after exposure, comprising:
    (a) a rear housing having a cassette housing chamber into which said cassette is loaded;
    (b) a front housing having a device which can selectively expose the photosensitive material in the rear housing;
    (c) a photosensitive material advancing means which advances the material after exposure, processing the material being exposed in a course of said advancing by said developer agent;
    (d) an upper cover to open and close an opening of the cassette housing chamber; wherein said cover has a photosensitive material send out opening which can make the discharging of the photosensitive sheet material being processed and advanced by said photosensitive material advancing means to outside, and can be shifted against the rear housing, being shifted selectively to a state wherein the photosensitive material send out opening and the advancing means come very close to each other and to a state wherein they are largely separated from each other;
    (e) a folding means which can bring the rear housing and the front housing from a state in which said housings are largely separated from each other to a folded state in which said housings come very close to each other and at least a portion of the front housing is contained in the rear housing;
    (f) a bellows which shields light in a space formed between the rear housing and the front housing, wherein said bellows can be expanded and shrunk in an association with said folding means, and
    (g) an opening and closing cover which covers the surface of the front housing exposed to outside out of the rear housing when the front housing is folded in the rear housing, wherein said cover is mechanically linked with the above mentioned upper cover and the folding means, and the shifting of the upper cover and the folding action of the folding means are controlled in an association with the control of said opening and closing cover.

2. A camera according to claim 1, in which said upper cover has an opening being so provided as placed at a position corresponding to the finder provided at the rear housing when the above mentioned photosensitive material send out opening is at a position being largely separated from the photosensitive material advancing means, and placed at a position not corresponding to said finder when said photosensitive material send out opening is at a position very close to said photosensitive material advancing means.

* * * * *